April 26, 1949.                J. H. BLACK                    2,468,021
            AIR-BORNE PARTICLE COLLECTOR AND METHOD OF
               ESTIMATING THE SOLIDS IN AIR STRATA
                       Filed Nov. 4, 1947
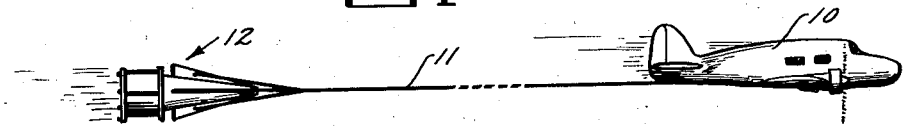
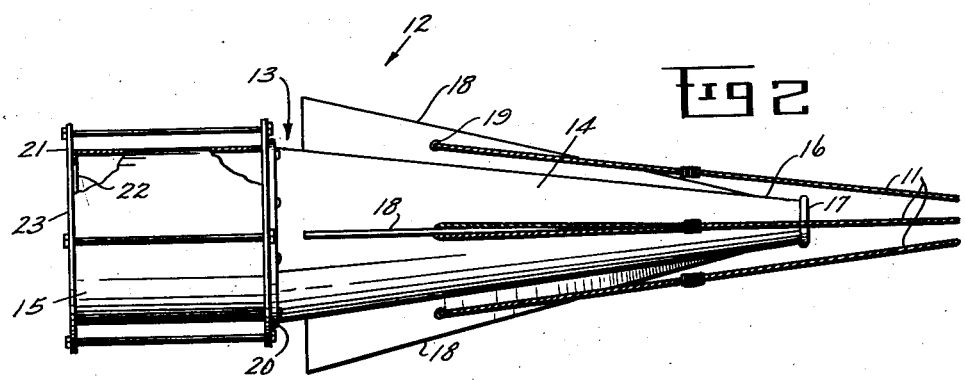
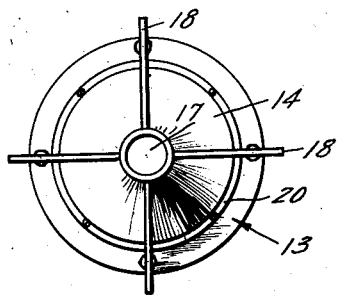
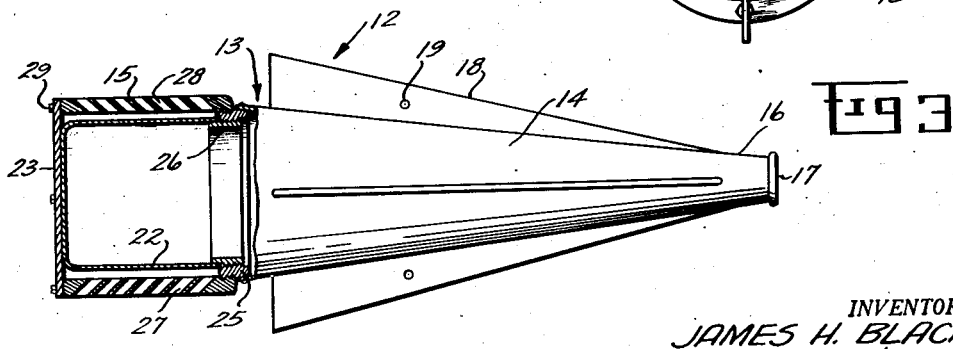
INVENTOR.
JAMES H. BLACK
BY
ATTORNEYS Patented Apr. 26, 1949

2,468,021

UNITED STATES PATENT OFFICE 2,468,021

AIR-BORNE PARTICLE COLLECTOR AND METHOD OF ESTIMATING THE SOLIDS IN AIR STRATA

James H. Black, Clarke County, Ohio

Application November 4, 1947, Serial No. 783,888

5 Claims. (Cl. 73—28)

(Granted under the act of March 3, 1883, as amended April 30, 1928; 370 O. G. 757)

The invention described herein may be manufactured and used by or for the Government for governmental purposes without payment to me of any royalty thereon.

This invention relates to an apparatus for and a method of estimating the dust or pollen content of air strata.

Up to the present invention, no way was known for estimating upon a basis of actual measurement, the number of solid particles in any particular stratum of the upper air. Optical methods are impractical because they are interfered with too much by moisture droplets distributed as aerosols.

Patent 1,517,144 discloses a dust determinator in which the entire volume of air to be estimated or a fraction thereof must be pumped through a filter. This is obviously impractical for outdoor work where a large area must be accurately determined.

One object of the present invention is to provide means and method to estimate accurately the dust concentration in high strata of the atmosphere.

Another object is to make such a determination valid for a considerable area, which may be miles in extent.

Another object is to make such a determination at a point removed from any station for example an airplane, which itself might be a source of dust.

Another object is to provide a simply constructed particle collector which may be easily towed behind an airplane.

Another object is to provide a particle collector of the above character which may be easily disassembled to change filtering elements or to weigh them.

Briefly stated, the method comprises towing at a particular level a pre-weighed particle collector, or a particle collector containing a pre-weighed filtering element, behind an airplane, the particle collector having an inlet of known area, and towing such a filter for a measured distance through the particular stratum. The increase in weight of the particle collector or filtering element is then noted and the increase is divided by the volume of air that has passed through the filter, hence the particle concentration per unit of volume is known. The volume is calculated by multiplying the area of the collector inlet by the distance traversed and converting this volume to the desired units.

In order to practice the method, the traverse through the air need not be horizontal. It may be vertical or nearly so. The filter may be launched from an airplane and provided with a parachute so that in its descent, the collector will take dust from every level between the earth and the height from which it was launched.

In the drawings:

Fig. 1 shows an airplane in perspective in the act of carrying out the method.

Fig. 2 is a side elevation of one form of the air filter, partly in section.

Fig. 3 is a front elevation of the filter.

Fig. 4 is a view corresponding to Fig. 2 showing a modified form which employs a cup-shaped filter element.

In Fig. 1, 10 is an airplane, 11 is a tow rope and 12 the particle collector of my invention which is being towed behind the airplane 10 at the end of the rope 11. The dashed section of the rope 11 indicates that the rope may be of any desired length.

In Fig. 2 the collector 12 comprises a body portion 13 which is composed of a conical forward portion 14 and a cylindrical rear portion 15. In Fig. 3 these portions are seen to form concentric circles. At the forward end of portion 14 is a round neck 16 in which there is an opening 17 of standard diameter, for example, two inches inside diameter. Four or more stabilizing fins 18 project outwardly from the conical portion 14 and extend from near the neck 16 to near the cylindrical portion 15.

In the fins 18 there are holes 19 through which the tow rope 11 may be tied. The fins 18 may be dispensed with if a fastening equivalent to the holes 19 is applied to the collector to tow the latter without oscillation.

Approximately where the cylindrical portion 15 joins the conical portion 14 there is a flange 20. A cage 21 is bolted to the flange 20 and its purpose is to hold a filter element 22 which may be made of metal screen, silk mesh, filter paper or other suitable material at the exit or rear end of the body 13. The rear portion 23 of the cage 21 is either perforated or itself made of strong coarse wire mesh so that both ample mechanical support and ample filtering area is provided for the filter 22. The latter may be of either sheet form or cylindrical. If cylindrical, the side walls of the cylindrical portion 15 may be made of wire mesh or be otherwise multi-perforated as hereinafter disclosed.

The preferred form is the modification shown in Fig. 4. The forward part of this form is identical with that shown in Fig. 2 but the flange 20 is omitted and the construction rearwardly of the line corresponding to the location of the flange 20 in Fig. 2 is different. A ring 25 which is threaded both internally and externally is screwed into the body 13. An externally threaded ring 26 is screwed into ring 25 so as to leave about ¼" projecting therefrom. A recessed shoulder 27 is so formed. The projecting part of ring 26 is preferably unthreaded.

The recessed shoulder 27 serves to retain a porous filter cup 22, which may be made of metal screen, paper or cloth, and to prevent it from collapsing from air pressure. The cup 22 is arranged to fit within a cylindrical rear portion 15 which is provided with a multiplicity of backward and outwardly slanting louvers 28 in rows separated by longitudinal imperforate ribs (not shown). Such ribs are conventional. An imperforate rear closure wall 23 serves to retain the filter cup 22. The wall 23 can optionally also be multi-perforated. In any case it is perforated to the extent of receiving a plurality of screws 29 for attachment of the wall 23 to the cylindrical body 15. The rear wall retains the filter element rim within the recessed shoulder 27.

The body 15 may also be made in other generally cup-shaped forms, for example, a cone, the apex of which is rearwardly disposed.

In use, the air which streams into the opening 17 makes its exit from the collector through the louvers 28 of the body 15 after having passed through the filter element 22 and having left on it whatever solid matter which was in suspension. The cup shape of the filter element 22 makes it convenient for weighing before and after the solid matter is deposited in it.

I claim as my invention:

1. The process of determining the dust content of outdoor air which comprises traversing a weighed air particle collector of suitable fineness and of known inlet area through a measured distance in air, and then weighing the collector to ascertain the increase due to filtered solid particles.

2. The method of estimating the dust content of the atmosphere at a particular level which comprises towing at that level a dust collector of known inlet area and which comprises a filtering element of known weight of a fineness that will retain atmospheric dust, in a substantially straight path from an aircraft for a measured distance and then weighing the filtering element to determine the increase in weight per unit volume of air traversed.

3. A dust collector comprising a hollow body of minimum air resistance having a standard-sized forward opening, a plurality of stabilizing fins on said body having openings therethrough for the attachment of ropes whereby the collector may be towed in a stable manner behind an airplane, an air-porous filter element of known area capable of retaining dust within said body substantially at the rear thereof and demountable means for supporting said filter element without substantial interference with its porosity for air.

4. A dust collector comprising a hollow conical portion having circular forward opening, and a hollow cylindrical portion, said cylindrical portion being detachably joined to said conical portion where the latter is widest, a flange extending outwardly on the exterior of the filter at approximately the junction of the two portions, a cage attached to said flange and enclosing said cylindrical portion, said cage including a rear retainer of porous character, for said cylindrical portion an air-porous filter element adjacent to and supported by said rear retainer and at least one stabilizing fin extending outwardly from said conical portion said fin having an opening for the attachment of a rope whereby said collector may be towed through the air by an airplane and prevented from oscillating during such towing.

5. A dust collector comprising a body having a hollow conical forward portion to present minimum air resistance and a hollow rear cup-shaped portion adapted to contain a cup-shaped filter, said cup-shaped portion being detachably joined to said conical forward portion where the latter is widest, a pair of threaded concentric rings at the junction of the two parts of the body the outer of said rings threadedly engaging each body portion, the inner ring forming a recessed shoulder within said rear cup-shaped portion, a cup-shaped filter element within said cup-shaped portion, the rim of said filter element being retained in said recessed shoulder by said inner ring to prevent collapse of said filter, a detachable rear wall for said rear cup-shaped portion, said wall also retaining said filter element rim within said recessed shoulder, and at least one stabilizing fin on the conical forward portion of said body, said fin having an opening for the attachment of a rope whereby the device may be towed by an airplane, the fin then serving also to prevent the device from twisting the rope.

JAMES H. BLACK.

REFERENCES CITED

The following references are of record in the file of this patent:

UNITED STATES PATENTS

| Number | Name | Date |
|---|---|---|
| 984,047 | Touzalin | Feb. 14, 1911 |
| 1,517,144 | Anderson | Nov. 25, 1924 |
| 2,079,474 | Walsh | May 4, 1937 |